United States Patent [19]
Black et al.

[11] Patent Number: 5,449,882
[45] Date of Patent: Sep. 12, 1995

[54] MIRROR-BASED LASER-PROCESSING SYSTEM WITH TEMPERATURE AND POSITION CONTROL OF MOVING LASER SPOT

[75] Inventors: Michael Black, Foster City; Vladimir Kupershmidt, Pleasanton, both of Calif.

[73] Assignee: Reliant Laser Corporation, Foster City, Calif.

[21] Appl. No.: 31,529

[22] Filed: Mar. 15, 1993

[51] Int. Cl.⁶ .............................................. B23K 26/04
[52] U.S. Cl. ............................. 219/121.83; 219/121.74
[58] Field of Search ....................... 219/121.83, 121.63, 219/121.64, 121.74, 121.8, 121.61

[56] References Cited

U.S. PATENT DOCUMENTS

| | | | |
|---|---|---|---|
| 4,518,232 | 5/1985 | Dagenais | 219/121.74 |
| 4,655,592 | 4/1987 | Allemand | 219/121.74 |
| 4,749,840 | 6/1988 | Piwczyk | 219/121.74 |
| 4,761,534 | 8/1988 | Foulkes | 219/121.63 |
| 4,801,352 | 1/1989 | Piwczyk | 219/121.61 |
| 4,822,975 | 4/1989 | Torigoe | 219/121.74 |
| 5,382,770 | 1/1995 | Black et al. | 219/121.83 |

FOREIGN PATENT DOCUMENTS 63-177991  7/1988  Japan .................. 219/121.8

Primary Examiner—Geoffrey S. Evans

[57] ABSTRACT

A mirror-based laser processing system, e.g., for laser welding, provided with manual control of movements of a laser welding spot W on an object O being treated. The system includes a laser source (10) which generates a laser beam capable of treating the object (O), a mirror-based micromanipulator (14) which consists of a concave mirror (18) and a convex mirror (16) facing each other, and a laser beam splitter (20) which is located on the path of the laser beam reflected from concave mirror (18). The object is located in a focusing position of the laser beam reflected from the laser beam splitter (20). The system has a sensor head (32) for controlling the positions and temperature of the welding spot W. The sensor head is provided with a laser unpenetrated protective window (34), a neutral-density filter (36) which attenuates the infrared scattering light reflected from object O being treated, an infrared narrow-band filter 38 which passes only thermal components of the scattered infrared light, and photodetectors (40) and (42), which convert the intensity of the received light into electrical signals which carry information about the spatial temperature distribution in the vicinity of welding spot W.

11 Claims, 2 Drawing Sheets

MIRROR-BASED LASER-PROCESSING SYSTEM WITH TEMPERATURE AND POSITION CONTROL OF MOVING LASER SPOT

BACKGROUND—FIELD OF THE INVENTION present invention relates to the field of laser processing, particularly to a mirror-based laser-processing system, e.g., a laser welding system, with temperature and position control of the moving welding spot.

BACKGROUND—DESCRIPTION OF PRIOR ART

Recently, laser processing, i.e., cutting or welding with the use of a laser beam, has found increased practical applications in various fields, such as the manufacturing of semiconductors, dies, or other kinds of specialties involving fine engraving in metals, etc.

In mass production, the welding process is automated and does not require active visual control. However, in experimental and custom-designed manufacturing processes, which are characterized by individual or small-batch orders, the use of a specially-designed active-control system is economically unjustifiable, and therefore manual active control is often required.

In recent years, the use of direct monitoring by means of television has increased. All of the methods available for directly monitoring an arc welding area with a television camera have involved attempts to duplicate what the welding operator actually sees. For this purpose, the camera has been placed in such a position that it provides an oblique view of the welding process, similar to the view enjoyed by the operator. Such an oblique-viewing system is described, e.g., in U.S. Pat. No. 4,532,404, issued in 1985 to Boillot, et al. The oblique view of the welding has an inherent problem, in that it also results in the viewing of the area around the welding spot, which is very bright. The brightness is so great that it tends to wash out the entire picture unless appropriate filters are used. Therefore, methods for the oblique viewing of the weld and of the welding-spot area also involve the filtering of the view by a camera to one or several discrete wavelengths of light, rather than simply the viewing the broad spectrum of light that is available from the welding spot.

U.S. Pat. No. 4,532,408, issued in July 1987 to R. Richardson, describes an optical apparatus which may be used for viewing a welding process, wherein the view is directly parallel to and around the electrode, thus allowing the electrode tip to block the welding spot from direct view. The light seen is reflected from the mirror-like molten pool, revealing the edge of the pool which is a parameter directly analyzed by video picture analysis to control the welding process.

However, Richardson's system is a lens-based optical system which is designed only for a predetermined wavelength of the transmitted light. Furthermore, this system transmits UV light poorly, is highly expensive, and is inapplicable for low-energy applications, such as treating low-melting-point materials.

The above disadvantage can be obviated by utilizing mirror-based systems which are capable of efficiently transmitting UV light. An example of such a system is an apparatus of U.S. Pat. No. 4,315,130, issued February 1982 to M. Inagaki, et al. The Inagaki apparatus provides a laser beam which is emitted from a laser source and is divided into a plurality of fractional laser beams. The latter are irradiated toward the object being treated after being compounded in such a manner that the energy density distribution on the irradiated area is made substantially uniform in at least one direction. This allows a uniform treatment. However, the Inagaki system is characterized by significant astigmatic aberration, thus making it impossible to perform precise profile treatment operations with welding spots having micron dimensions. Moreover, Inagaki's mirror-based system cannot be actively controlled. This system has a laser spot in a fixed position and does not allow the scanning of the object.

Boilott, supra, describes a system which allows the temperature control of the welding spot by means of a thermal sensor of the photoelectric type. The use of such a sensor, however, does not provide a thermal image of the treatment area and makes it impossible to obtain a thermal distribution pattern around the area of the welding spot. This is because the abovementioned sensor detects the integral thermal energy and does not differentiate between the points of the temperature pattern.

OBJECTS AND ADVANTAGES OF THE INVENTION

It is therefore an object of the invention to eliminate the above disadvantages and to provide a mirror-based laser-welding system with the ability to visually track and control the spot positions and the temperature of the moving laser spot. The system is simple in construction, inexpensive to manufacture, free of complicated filters, does not depend on high temperatures in the area of the laser spot being observed, is applicable for laser beams of any non thermal infrared or ultraviolet wavelength, is suitable for low-energy applications and for treating low-melting-point materials such as plastics, allows precise profile treatment operations on a submicron level, and makes it possible to obtain a thermal distribution pattern around the area being treated.

Other advantages and features of the invention will become apparent from a consideration of the ensuing description and drawings.

SUMMARY

In general, the system of the present invention is designed for the treatment, e.g., by welding or by cutting, of objects having irregular patterns and produced individually or in very small batches when programming is costly, time consuming, and not flexible.

The system includes a laser source which generates a laser beam capable of treating an object, a mirror-based micromanipulator which consists of a concave mirror and a convex mirror facing each other, and a non thermal infrared or ultraviolet laser beam splitter which is located on the path of the laser beam reflected from the concave mirror. The laser beam splitter has a coating capable of reflecting the laser beam and yet passing all frequencies of visible light except the single frequency of a visible aiming beam. The object is located in a focusing position of the laser beam reflected from the laser beam splitter. The movements of the laser beam splitter are manually controlled from an external terminal, which is made in the form of a joystick capable of moving the laser welding spot in any direction over the object's surface. Adjustments in the Z-axis direction are performed through a zoom system of the mirror-based micromanipulator. The system has a sensor head for controlling the positions and temperature of the welding spot W. The sensor head is provided with a laser unpenetrated protective window, a neutral-density filter which attenuates thermal infrared emissions from object O being treated, an infrared narrow-band filter which passes only thermal components of the thermal infrared light, and photodetectors which convert the intensity of the received light into electrical signals which carry information about the spatial temperature distribution in the vicinity of the welding spot. The system also contains a zoom control mechanism which automatically maintains the laser beam in a focused position on the object when the object's image is focused by means of the microscopic head.

DETAILED DESCRIPTION OF THE APPARATUS OF THE INVENTION

Figure 1:
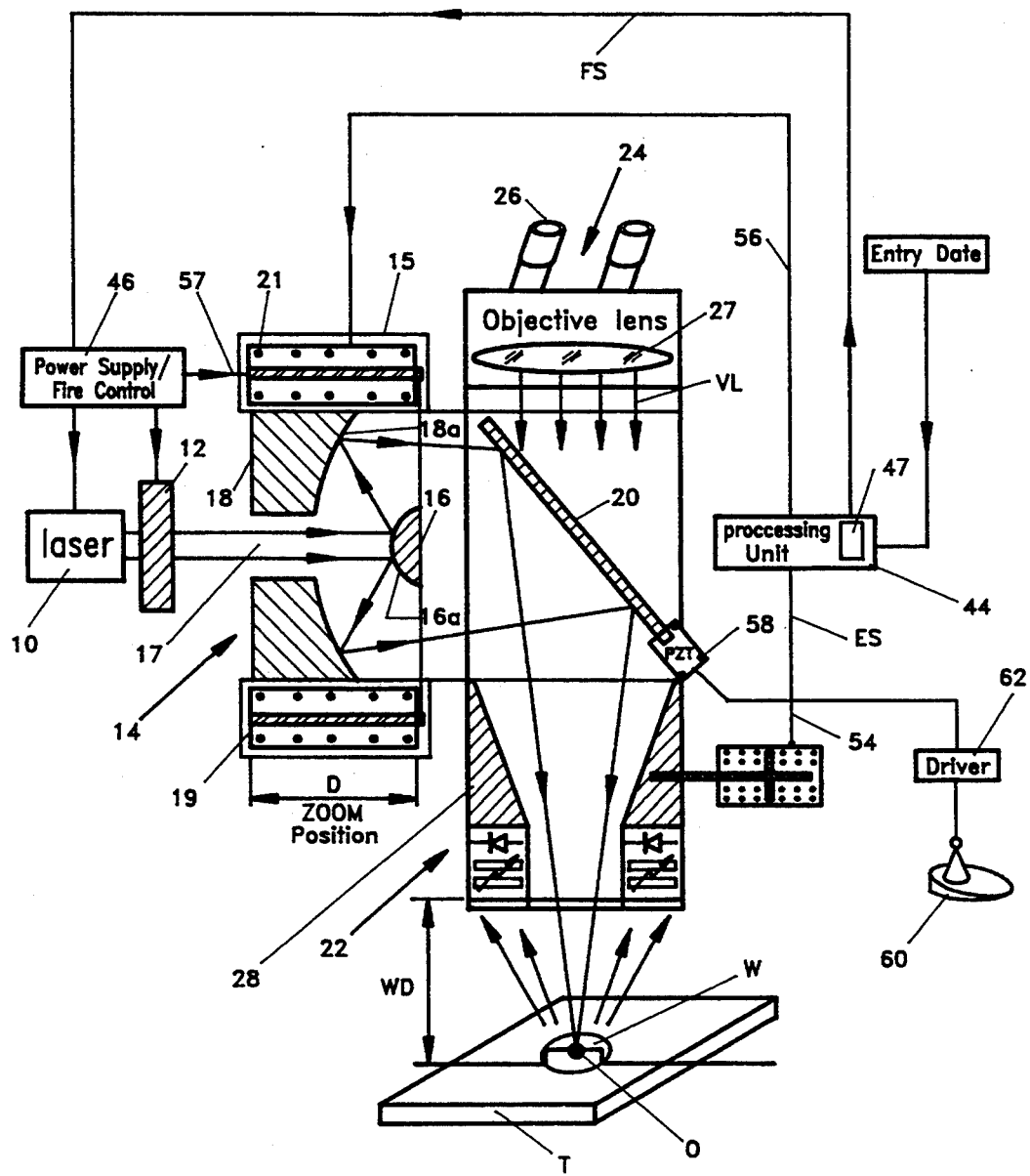
FIG. 1 is a general schematic view of the laser welding system of the invention with manual control by a joystick.

An example of a laser welding system of the invention is shown in FIG. 1, which is a general schematic view of this system, with manual control from a joystick. Parts of the system's elements are shown in a three-dimensional representation.

In the illustrated example, the system contains a laser source 10 of any type suitable for laser welding. Some examples of such sources are an Nd:YAG-type, excimer-type, and a $CO_2$ laser source, as are produced by many companies, for example, by Lambda Physik, in Acton, Mass.

On its output end, laser source 10 has a laser shutter 12 which controls the duration and repetition rate of a laser beam B emitted from source 10. The operation of laser shutter 12 is controlled remotely through a feedback loop from the treatment area, which will be described later. Laser beam B has a frequency in the electromagnetic spectrum excluding visible light frequencies (390 nm–770 nm) and thermal infrared frequencies (1.4 $\mu$m–8.0 $\mu$m). Laser source 10 may generate a visible aiming beam (not shown) which is used for the preliminary aligning and focusing of the laser unit prior to the generation of the power beam.

The next unit in the direction of the propagation of laser beam B from source 10 is a mirror-type laser micromanipulator 14 which is located between laser source 10 and a wavelength-selective beam splitter system 20.

Mirror-type laser micromanipulator 14 consists of two coaxially-arranged aspherical mirrors, i.e., a small-diameter convex mirror 16, a convex front surface 16$a$ of which faces the incident laser beam B emitted from source 10, and a large-diameter concave mirror 18 which has a central opening 17 for passing a laser beam toward mirror 16. The concave front surface 18$a$ mirror 18 faces convex front surface 16$a$ of mirror 16. Micromanipulator 14 has a zoom system 15 which may change the focusing distance of micromanipulator 14 by changing a distance D between mirrors 16 and 18 in response to the variation of the operating conditions, such as the different dimensions of an object O being treated, different magnification factors, different microscope heads, etc. This zoom system 15 consists of a zoom electromagnetic core 19 which is rigidly connected to concave mirror 18. The latter has guides (not shown) in which it can slide in the optical-beam propagation direction. Core 19 is surrounded by a zoom electromagnetic coil 21, which can magnetically interact with core 19 to cause the displacement of the core under the effect of magnetic forces proportional to the applied current. The current, in turn, depends on the working distance WD of a laser processing head 22, which will be described later.

The above-described mirror-based system ensures that the aiming beam and the power beam are focused in the same point on object O with absolute accuracy. This results from the nature of the mirror system itself and cannot be achieved with the use of a lens system.

A similar mirror-type laser delivery system is used in laser microsurgery and is described in Applicant's prior U.S. Pat. No. 5,128,509, granted to M. Black and V. Kupershmidt in 1992.

Laser beam B received by mirror 16 is reflected in a diverging manner toward mirror 18, which, in turn reflects it in a converging manner towards laser beam splitter 20. The latter comprises a plain-parallel plate with a special wavelength-selective coating 20$a$, on the surface which faces the incident focused laser beam B from mirror 18. This coating possesses high reflectivity and a high damage threshold with respect to the working laser wavelength; therefore, it reflects the incident laser beam B toward the treatment area of object O. On the other hand, the same coating is highly permeable to visible light (VL) except the single frequency of the visible aiming beam. As a result, laser beam B will be reflected and focused onto object O in the form of a welding spot W for treating, e.g., welding, the object, while the visible-light from object O will be transmitted through beam splitter 20, enabling the observation of the treatment area of object O through a microscopic head 24. This head, which has an objective lens 27 and eyepieces 26 for visual control, may be removably attached to the welding apparatus on the side of beam splitter 20 opposite to object O. Beam splitters 20 of the type described above may be produced, for example, by OCLI Corporation of Santa Rosa, Calif. If necessary, eyepieces 26 can be replaced by a TV camera (not shown). Microscopic head 24 can be focused onto object O and used for initial positioning of laser spot W on object O.

Laser processing head 22 has a cylindrical housing 28 with a conical opening 30, which converges toward object O. Housing 28 functions as a nozzle that protects the operator from the scattered laser light.

Figure 2:
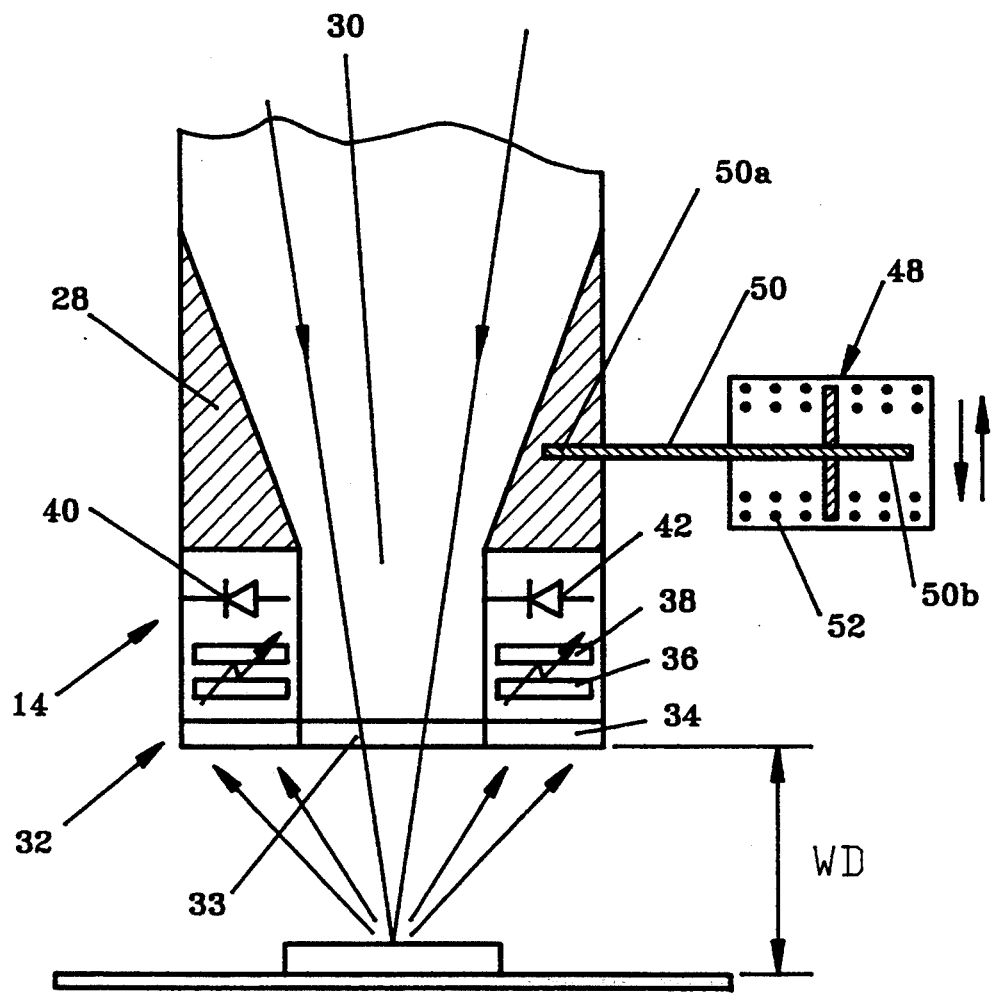
FIG. 2 is a perspective view of a sensor head used for controlling the positions and temperature of the welding spot created by the system of FIG. 1.

The lower end of housing 28 which faces object 0 supports a sensor head 32 which is shown in a greater detail in FIG. 2. FIG. 2 provides a perspective view of this sensor head. Head 32 is used for controlling the positions and the temperature of the welding spot W. Sensor head 32 has a through central opening 33 and the end of this sensor head the treatment area is protected by an annular window 34, e.g., a germanium plate. This plate does not permit the laser beams scattered from the treatment area to pass, but is penetrable to thermal infrared radiation. Located above window 34 is a neutral-density filter 36, which attenuates the infrared thermal emissions from object O being treated. The next element above neutral-density filter 36 is an infrared narrow-band filter 38 which passes only specific thermal components of the thermal infrared light (i.e., does not pass the treatment component of the infrared light). The light which passes through window 34, neutral-density filter 36, and infrared narrow-band filter 38 is sensed by photodetectors 40 and 42. It is understood that more than two photodetectors may be arranged circumferentially in sensor head 32 above neutral-density filter 36.

Photodetectors 40 and 42 convert the intensity of the received light into electrical signals which carry information about spatial temperature distribution around and in welding spot W of object O. For optimization of the treatment conditions, the outputs of photodetectors 40 and 42 are connected via a processing unit 44 and feedback loop FS to a laser-source fire-control unit 46, and from there to laser source 10 and shutter.

Processing unit 44 contains memory units 47 which store an algorithm of the thermal process for given laser treatment conditions. In other words, the data known about the specific material being treated and the specific treatment or operating conditions can be entered into memory units 47 and then processed in accordance with the above algorithm, in order to control the operation of laser source 10 and shutter 12, and thus the optimization of the treatment.

The system also has a magnetic displacement sensor 48 which enables the adjustment of a working distance WD (that is to say, the distance from the lower end face of sensor head 32 to object O). Displacement sensor 48 consists of a focusing magnetic core element 50, one end 50a of which is rigidly connected to housing 28, while an opposite end 50b is inserted into a focusing electromagnetic coil 52. Since housing 28 is rigidly connected to microscopic head 24 (or another focusing device) which is used for focusing a welding spot W on the treated surface of object O, core end 50b is shifted with respect to electromagnetic coil 52 which is attached to a stationary housing (not shown). An output 54 of displacement sensor 48 is connected to a processing unit 44. Unit 44 recalculates the displacements of core 50, on the basis of a linear relationship, into an error signal which is transmitted via a signal circuit 56 to zoom mechanism 15 of micromanipulator 14. Laser-source laser-control unit 46 is connected to electromagnetic coil 21 via a lead 57. In other words, distance D between mirrors 16 and 18 is automatically changed in response to the movements of objective lens 27 of microscopic head 26.

A two-axis piezoelectric transducer (PZT) 58 is attached to an outer end of laser beam splitter 20 and to an external terminal 60 which is capable to control the positions of laser spot W on object O. This device comprises a control handle, which has two degrees of freedom and is thus capable of providing for the movement of laser spot W in the plane of the object. A PZT driver 62 is located between external terminal 60 and PZT 58. A control element, such as a handle, of external terminal device 60 can be turned around mutually perpendicular axes, thereby moving welding spot W, through PZT 58 and PZT driver 62, in the plane of object O. Since this control device is practically the same as the "joystick" used in airplanes and computer games, it will be hereinafter referred to as joystick 60. If object O is three-dimensional, movements in the direction of the vertical axis, i.e., axis Z, can be controlled through the above-mentioned zoom mechanism 15.

Object O is fixed in a required position on a stationary table T, which, if necessary, may have a drive mechanism for manual or automatic movement in a horizontal orthogonal system.

In practical application, the mirror-type laser welding system of the invention will provide (for Nd:YAG laser) a welding spot having dimensions of about 10 μm.

OPERATION

The operation of the mirror-based laser system will be described with reference to a case involving a welding operation, although it shall be understood that the same system is applicable to fusing, cutting, engraving, perforating, and similar operations.

The system can be used most efficiently for treating objects of irregular shape in an individual and small-batch production where the use of programmed universal machines is economically unjustifiable, and where the laser spot is manually guided along a required path.

An example of such an object O is shown in FIG. 1. Prior to treatment, object O is fixed to table T in a required position. An operator then focuses objective lens 27 of microscope head 24 to provide a sharp image of object O and switches on laser source 10 to activate the aiming beam.

Simultaneously with the movement of microscopic head 24, core element 50 of magnetic displacement sensor 48, which is rigidly connected to housing 28 of laser processing head, and hence, to microscopic head 24, also moves with respect to electromagnetic coil 52. This changes the magnetic flux which generates a current error signal ES in coil 52.

Error signal ES is transmitted to processing unit 44. The latter processes signal ES into a signal proportional to the variation δWD of the working distance WD. On the basis of linear relationships between a variation δD in the distance between mirrors 16 and 18 and δWD, which is expressed by the following formula:

$$\delta D = -a \times \delta WD,$$

processing unit 44 generates a signal which corresponds to δD and is sent to zoom mechanism 15. The latter automatically changes distance D between mirrors 16 and 18. Thus, zoom mechanism 15 always tracks variations in working distance WD.

Using joystick 60 and observing the area to be treated through objective lens 27, the operator places the laser spot W at a position on object O where the operation is to begin. The movements of joystick 60 are transmitted to laser beam splitter 20 via PZT driver 62 and piezoelectric transducer 58.

When the laser treatment beam B is emitted from laser source 10, it is delivered to concave mirror 18, is reflected from it to convex mirror 16, and then reflected further from the latter to the facing surface of laser beam splitter 20, and from there to object O, where it forms a power-light spot (which hereinafter will be referred to as a "welding spot W"). The laser spot heats the area surrounding welding spot W.

The heated area irradiates scattered infrared light which passes through window 34, a neutral-density filter 36 which attenuates the infrared scattering light reflected from object O being treated, infrared narrow-band filter 38 which passes only thermal components of the scattered infrared light, and is sensed by photodetectors 40 and 42.

Photodetectors 40 and 42 convert the intensity of the received light into electrical signals which carries information about spatial temperature distribution around and in welding spot W of object O.

The output signals of photodetectors 40 and 42 are sent, via a processing unit 44 and a feedback loop FS, to a laser-source fire-control unit 46, and from there to laser source 10 and shutter 12, respectively. As a result, the process is always maintained under conditions optimal to the specific work operation, on the basis of data which had been entered prior to the operation into memory units 47 of processing unit 44.

SUMMARY, SCOPE, AND RAMIFICATION

Thus, we have provided a mirror-based laser-welding system with visual tracking and controlling positions, which further controls the temperatures of the moving laser spot. The system is simple in construction, inexpensive to manufacture, is free of complicated filters, does not depend on high temperatures in the area of the laser spot being observed, is applicable for laser beams of any non-thermal infrared or ultraviolet wavelength, is suitable for low-energy applications and for treating low-melting-point materials such as plastics, allows precise profile treatment operations on a submicron level, and makes it possible to obtain a thermal distribution pattern around the area being treated.

Although the laser processing system has been shown and described in the form of one specific embodiment, this embodiment, its parts, materials, and configurations have been given only as examples, and many other modifications of the laser processing system are possible. For example, the system is suitable not only for welding, but for cutting, engraving, marking, deburring, and so forth. The movements of the laser spot can be carried out automatically through a program, instead of joystick 60. A TV camera may be installed on laser processing head 22, instead of on microscopic head 24. Therefore, the scope of the invention should be determined, not by the example given, but by the appended claims an their legal equivalents.

We claim:

1. A mirror-based laser-processing system with temperature and position control of a moving laser spot comprising:
    a laser source which generates a laser beam capable of treating an object, said laser beam having a frequency in the electromagnetic spectrum excluding visible light frequencies and thermal infrared light frequencies;
    a laser source control means for generating a plurality of laser-source control signals;
    a mirror-based micromanipulator comprising a concave mirror and a convex mirror facing each other and spaced apart, said concave mirror having a central hole for passing said laser beam, said convex mirror being located on the path of said beam passing through said concave mirror and reflecting said beam in a divergent manner onto said concave mirror, said concave mirror reflecting said beam in a converging manner;
    a laser beam splitter which is permeable to visible light, located on the path of said beam reflected from said concave mirror, and inclined with respect to the direction of said reflected beam, said laser beam splitter having a coating capable of passing visible light, but reflecting said laser beam onto said object, said object being located in a focusing position of said laser beam reflected from said laser beam splitter, said laser beam splitter having means for controlling its movement with respect to said beam, thereby moving said laser spot over said object;
    temperature-control means for controlling a temperature in the area surrounding said laser spot, said temperature-control means having feedback means for sending a feedback signal to said laser source for the optimization of said treating of said object; and
    means for the observation of said object, said observation means being located on a side of said beam splitter opposite to said object.

2. The mirror-based laser processing system of claim 1 wherein said temperature control means comprises:
    a sensor head with a through opening for passing said reflected laser beam, along with the following elements located on the lower end of said head around said opening and arranged sequentially in the direction from said object toward said beam splitter:
    an annular window impenetrable to scattered light from said laser beam and penetrable to thermal infrared light emissions from said object;
    a neutral-density filter which attenuates said thermal infrared light emissions from said object and passes only specific thermal components of said thermal infrared light emissions; and
    at least two photodetectors for converting the intensity of said specific thermal components into electrical signals.

3. The mirror-based laser processing system of claim 2 wherein said means for observation is a microscopic head.

4. The mirror-based laser processing system of claim 3 wherein said mirror-based micromanipulator further includes a zoom system which changes said distance between said concave mirror and said convex mirror, said zoom system consisting of a zoom electromagnetic core rigidly connected to said concave mirror, and a zoom electromagnetic winding surrounding said zoom electromagnetic core and interacting therewith.

5. The mirror-based laser processing system of claim 4, further including a focusing means for automatically maintaining said reflected laser beam in said focusing position on said object when said microscopic head is focused onto said object.

6. The mirror-based laser processing system of claim 5 wherein said focusing means comprises a focusing magnetic core rigidly attached to said sensor head; a stationary focusing electromagnetic coil which electromagnetically interacts with said focusing core and generates a current error signal in response to said focusing with said microscopic head; a processing unit which receives said current error signal and has means for converting said current error signal into a zoom control signal which is proportional to the displacement of said sensor head during said focusing.

7. The mirror-based laser processing system of claim 6 wherein said means for controlling the movements of said laser beam splitter with respect to said laser beam comprises:
    a two-axis piezoelectric transducer attached to said laser beam splitter;
    an external terminal having a control element with two degrees of freedom; and
    a piezoelectric-transducer driver located between said piezoelectric transducer and said external terminal, so that the movements of said control elements are transmitted to said laser beam splitter and control movements of said laser beam across said object.

8. A mirror-based laser-processing system with temperature and position control of a moving laser spot comprising:

a laser source which generates a laser beam capable of treating an object, said laser beam having a frequency in the electromagnetic spectrum excluding visible light frequencies and thermal infrared light frequencies;

a laser source control means for generating a plurality of laser-source control signals;

a mirror-based micromanipulator comprising a concave mirror and a convex mirror facing each other and spaced apart, said concave mirror having a central hole for passing said laser beam, said convex mirror being located on the path of said beam passing through said concave mirror and reflecting said beam in a diverging manner onto said concave mirror, said concave mirror reflecting said beam in a convergent manner;

a laser beam splitter which is permeable to visible light, located on the path of said beam reflected from said concave mirror, and inclined with respect to the direction of said reflected beam, said laser beam splitter having a coating capable of passing visible light, but reflecting said laser beam onto said object, said object being located in a focusing position of said laser beam reflected from said laser beam splitter, said laser beam splitter having means for controlling its movement with respect to said beam, thereby moving said laser spot over said object;

a microscopic head for the observation of said object, said microscopic head being located on a side of said beam splitter opposite to said object;

temperature-control means for controlling a temperature in the area surrounding said laser spot, said temperature-control means having feedback means for sending a feedback signal to said laser source for the optimization of said treating of said object; said temperature control means comprising a sensor head with a through opening for passing said reflected laser beam, and the following elements located on the lower end of said head around said opening and arranged sequentially in the direction from said object toward said beam splitter: an annular window impenetrable to scattered light from said laser beam and penetrable to thermal infrared light emissions from said object; a neutral-density filter which attenuates said thermal infrared light emissions from said object and passes only specific thermal components of said thermal infrared light emissions; and at least two photodetectors for converting the intensity of said specific thermal components into electrical signals.

9. The mirror-based laser processing system of claim 8, further including a zoom system which changes said distance between said concave mirror and said convex mirror, said zoom system consisting of a zoom electromagnetic core rigidly connected to said concave mirror and a zoom electromagnetic winding surrounding said zoom electromagnetic core and interacting therewith; and a focusing means for automatically maintaining said reflected laser beam in said focusing position on said object when said microscopic head is focused onto said object.

10. The mirror-based laser processing system of claim 9 wherein said focusing means comprises a focusing magnetic core rigidly attached to said sensor head; a stationary focusing electromagnetic coil which electromagnetically interacts with said focusing core and generates a current error signal in response to said focusing with said microscopic head; a processing unit which receives said current error signal and has means for converting said current error signal into a zoom control signal which is proportional to the displacement of said sensor head during said focusing.

11. The mirror-based laser processing system of claim 10 wherein said means for controlling the movements of said laser beam splitter with respect to said laser beam comprises:

a two-axis piezoelectric transducer attached to said laser beam splitter;

an external terminal having a control element with two degrees of freedom; and a piezoelectric-transducer driver located between said piezoelectric transducer and said external terminal, so that the movements of said control elements are transmitted to said laser beam splitter, providing control of the movements of said laser beam across said object.

* * * * *